United States Patent [19]
Wu et al.

[11] Patent Number: 5,223,959
[45] Date of Patent: Jun. 29, 1993

[54] RED, BLUE AND GREEN SERIAL ENCAPSULATED LIQUID CRYSTAL DISPLAY AND DRIVING METHOD

[75] Inventors: Bao G. Wu; Yao D. Ma, both of Richardson, Tex.

[73] Assignee: Polytronix, Inc., Richardson, Tex.

[21] Appl. No.: 857,618

[22] Filed: Mar. 25, 1992

Related U.S. Application Data

[63] Continuation-in-part of Ser. No. 521,126, May 3, 1990, abandoned, which is a continuation-in-part of Ser. No. 380,973, Jul. 17, 1989, Pat. No. 5,056,898.

[51] Int. Cl.$^5$ .................................. G02F 1/13
[52] U.S. Cl. ................................ 359/51; 359/52
[58] Field of Search ................... 359/51, 52, 55, 84

[56] References Cited

U.S. PATENT DOCUMENTS

| | | | |
|---|---|---|---|
| 3,703,329 | 11/1972 | Castellano | 350/349 |
| 3,840,695 | 10/1974 | Fisher | 358/61 |
| 3,864,022 | 2/1975 | Moriyhma | 350/389 |
| 4,006,968 | 2/1977 | Ernstoff et al. | 350/339 R |
| 4,006,969 | 2/1977 | Kouchi et al. | 340/756 |
| 4,097,128 | 6/1978 | Matsumoto et al. | 350/335 |
| 4,396,250 | 8/1983 | Wada et al. | 350/335 |
| 4,448,492 | 5/1984 | Huffmann | 350/346 |
| 4,581,608 | 10/1986 | Aftergut et al. | 350/332 |
| 4,671,618 | 6/1987 | Wu et al. | 350/347 V |
| 4,688,900 | 8/1987 | Doane et al. | 350/347 V |
| 4,878,741 | 11/1989 | Fergason et al. | 350/339 F |
| 4,890,902 | 1/1990 | Doane et al. | 350/349 V |
| 5,056,898 | 10/1991 | Ma et al. | 428/1 |
| 5,168,380 | 12/1992 | Fergason | 359/52 |

*Primary Examiner*—William L. Sikes
*Assistant Examiner*—Ron Trice
*Attorney, Agent, or Firm*—T. D. Copeland

[57] ABSTRACT

This invention discloses the product of a liquid crystal display (LCD) device and the method of making same, wherein the resultant product is an improved color oriented LCD in which the liquid crystal material and the color dye material are intimately comingled within an enclosure of polymer material and/or encapsulated within the structure of microdroplets. The resulting color displayed by this LCD device is controlled by the selective application of electrical parameters, namely, voltage and frequency, to permit the droplets within a display device to absorb, scatter, or transmit light, and-/or color, or mixture of colors, determined by the dye materials and the applied electrical parameters employed.

4 Claims, 4 Drawing Sheets

(E=0)

(E = LO V)
LO f (E = LO V)
HI f (E = HI V)
LO f

RED, BLUE AND GREEN SERIAL ENCAPSULATED LIQUID CRYSTAL DISPLAY AND DRIVING METHOD

This application is a continuation-in-part (C-I-P) application of prior pending application, Ser. No. 07/521,126, filed May 3, 1990, by the present inventors, now abandoned, which prior application was itself a C-I-P of patent application, Ser. No. 07/380,973, filed Jul. 17, 1989, by the inventors of the instant application, and which later application issued on Oct. 15, 1991, as U.S. Pat. No. 5,056,898, for "Reverse Mode Microdroplet Liquid Crystal Light Shutter Displays" to the Inventors of this invention; and the contents of said prior applications and of said patent and the file wrappers thereof, are incorporated herein by reference. Co-inventor B. G. Wu's prior U.S. Pat. No. 4,671,618, and other U.S. patents cited therein, are also incorporated herein by reference.

BACKGROUND OF THE INVENTION

1. Field of the Invention

This invention relates to Liquid Crystal Displays (LCD's), which, in use, utilize unique optical properties of liquid crystals to provide display devices that require lower power to operate, and provide precise control of light intensity, contrast and color, thru the use of the electrical parameters of voltage and frequency.

2. Prior Art

U.S. Pat. No. 4,671,618, to B. G. Wu, et al; patents and references cited therein, and the following are part of the prior art:

1. J. W. Doane, N. A. Vaz, B. G. Wu & S. Zumer, Appl. Phys. Lett. 48, 269 (1986)
2. P. Drzaic, J. Appl. Phys. 60, 2142 (1986)
3. B. G. Wu, J. L. West & J. W. Doane, J. Appl. Phys. 62, 3925 (1987)
4. J. W. Doane, A. Golemme, J. L. West, J. B. Whitehead, Jr., and B. G. Wu, Mol. Cryst. Liquid Crystals 165, 511 (1988)
5. B. G. Wu, J. H. Erdmann, J. W. Doane, Liq. Cryst. 5, 511 (1989)
6. Y. D. Ma, B. G. Wu & G. Xu, Liquid Crystal Displays, J. W. Doane & Z. Yaniv, eds., SPIE 1257 (1990)
7. D. W. Allender & S. Zumer, Liquid Crystal Chemistry, Physics Applns. J. W. Doane & Z. Yaniv, eds., Proc. SPIE 1080, 18 (1989); J. H. Erdmann, S. Zumer & J. W. Doane, Phys. Rev. Lett. 64, 5107 (1990)

SUMMARY OF THE INVENTION

An object of this invention is to provide a unique liquid crystal display device wherein the output light is absorbed or scattered from droplets that are selectively controlled to show the desired colors.

Another object of this invention is to provide a method of making a color output liquid crystal display device, wherein the liquid crystal material and dye material are encapsulated within the same droplet.

A further object is to provide an extremely small and yet effective microdroplet containing liquid crystal material and dye material which are encapsulated in a transparent polymer material. When the term "miniature" is used it refers to droplet size or LCD thickness.

And another object is to produce a full-color addressable miniature display based on the microencapsulated dye/liquid crystal concept.

A still further object is to provide a liquid crystal display device that comprises a plurality of at least three dye materials contained in separate droplets with liquid crystals so that any one of the three colors may be displayed by selective control of the electrical parameters.

Another object is to provide a method of making these devices.

An additional object is to provide a method of activating the dye containing droplets of liquid crystal display material, selectively to produce a display of a particular color from a full color spectrum.

And yet an additional object is to provide a method of activating said droplets for color display that involves the use of electrical parameters, namely voltage and frequency.

DESCRIPTION OF PREFERRED EMBODIMENTS

Figure 1A:
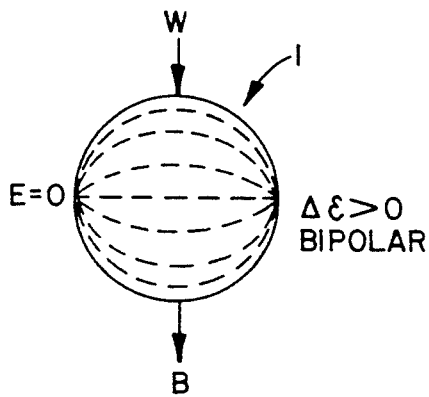
FIG. 1A represents a bipolar structure in the optic "off" state of a microdroplet (referred to as "droplet" hereafter) containing nematic liquid crystals material with a positive dielectric anisotropy.

Referring now more particularly to the characters of reference in the drawing, it will be observed in FIG. 1, that the representation shown in that of a single polymer dispersed liquid crystal (PDLC) droplet 1, more fully disclosed in B. G. Wu, et al, U.S. Pat. No. 4,671,618, which is incorporated herein by reference. This droplet 1 comprises a mixture of PDLC having a bipolar orientation, wherein the dielectric anisotropy of the liquid crystal material is greater than zero. This droplet comprises a nematic material liquid crystal.

In the instant invention, the liquid crystal material in the droplet is further mixed with one of three liquid crystal dyes taken from a group of primary colors, in this case, read, green and blue, with high dichroic ratios, which are dissolved in the particular host liquid crystal.

Figure 1B:
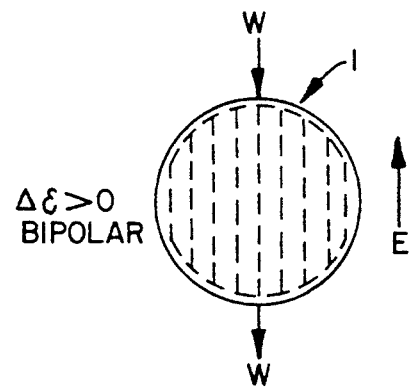
FIG. 1B is a representation of the item of FIG. 1A showing a depiction of the structure in the optic "on" state.

Droplet 1 contains a blue dye, and is effective to display a blue color in the absence of any applied electric field as shown in FIG. 1A, and to display no color when an electric field is present, as in FIG. 1B. This droplet does not utilize a separate encapsulating skin, and utilizes a "normal mode" function.

Figure 2A:
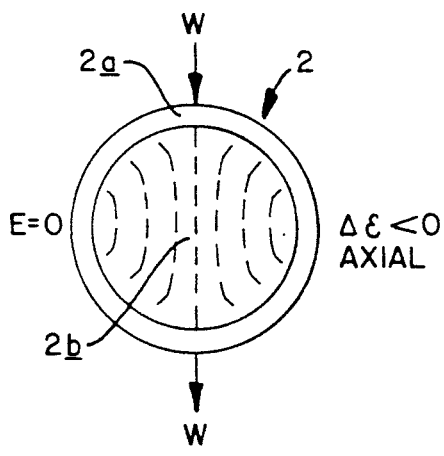
FIG. 2A represents an axial structure in the optic "on" state of a droplet containing nematic liquid crystal with a negative dielectric anisotropy.
Figure 2B:
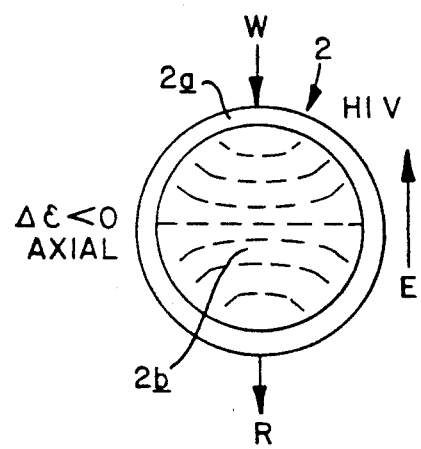
FIG. 2B is a representation of the item of FIG. 2A showing a depiction of the structure in the optic "off" state.
Figure 3A:
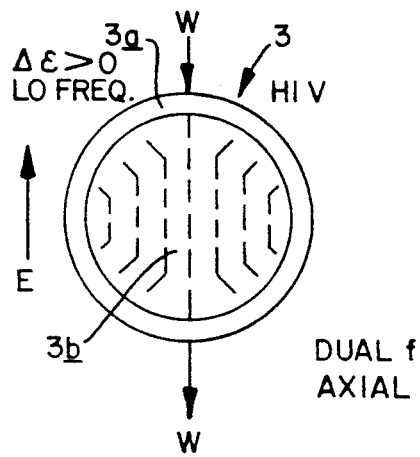
FIG. 3A represents a dual frequency axial structure when subjected to a field of high voltage and low frequency, with the director lines parallel to the electric field, and the droplet in the optic "on" state.
Figure 3B:
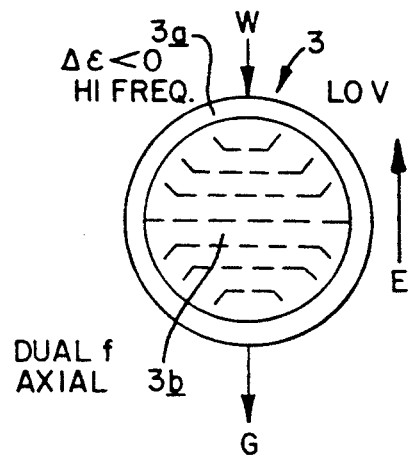
FIG. 3B is a representation of the item of FIG. 3A when the field is one of low voltage and high frequency, and the droplet is in the optic "off" state.

The droplets shown in FIGS. 2A, 2B & 3B demonstrate the "reverse mode" function, as first described in U.S. Pat. No. 5,056,898, and as here shown to portray "aligned" molecules in FIGS. 2A and 3A, and to portray "non-aligned" molecules (also directors, when under electric influence) in FIGS. 2B and 3B, where the directors are perpendicular to the applied electric field.

The droplet 2 of FIG. 2A is a droplet having orientation where the dielectric anisotropy of this nematic liquid crystal is less than zero. Droplet 2 contains a red dye, and is effectivbe to display a red color in the presence of an electric field, as indicated in FIG. 2B.

The droplet 3 of FIGS. 3A an d 3B, is a mixture of PDLC having an axial structure whose dielectric anisotropy changes from greater than zero at low frequencies to less than zero at high frequencies. This droplet presents a transparent colorless display both in the presence of an electric field at low frequencies, as seen in FIG. 3A, and in the absence of an electric field, and presents a green color display at low voltage and high frequencies, as shown in FIG. 3B.

In FIGS. 2A-3B (and in FIGS. 6A-6D), the reverse mode droplets 2 and 3 are comprised, respectively, of liquid crystal bodies 2b and 3b, that are enclosed in their polymer skin 2a and 3a.

Figure 4:
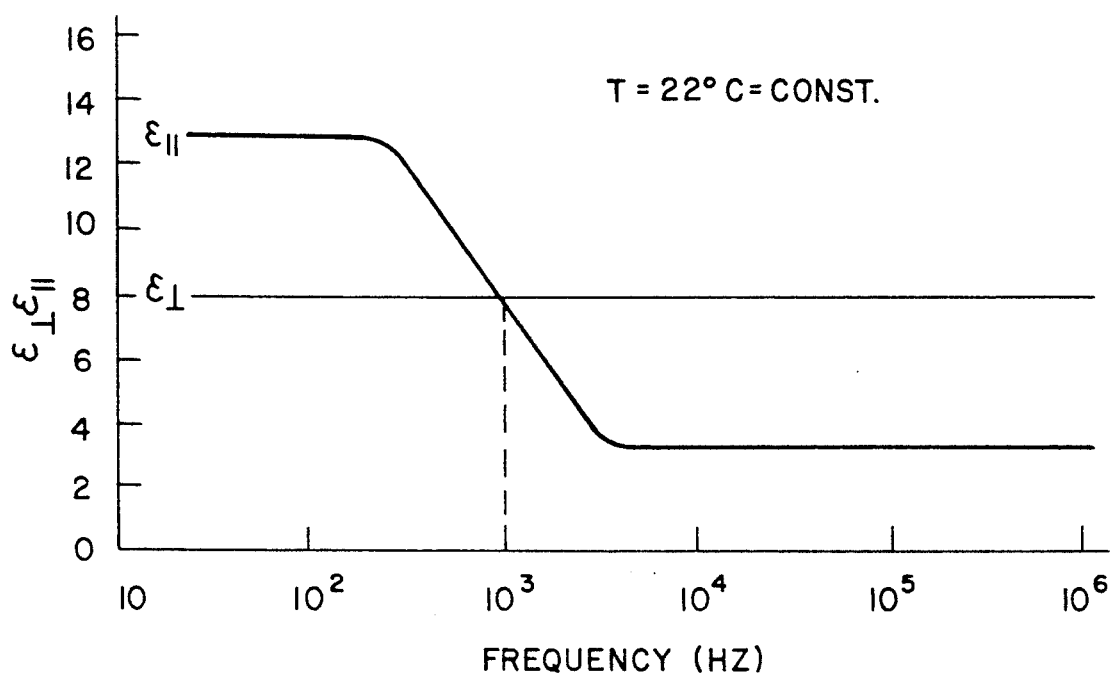
FIG. 4 is a chart showing the values of the dielectric constants in a direction parallel to the longitudinal axis of the liquid crystal and in a direction perpendicular to that axis for different frequencies of the applied field; and showing that the dielectric anisotropy, will change its sign at about 1000 Hz, when the temperature is 22° C.

The chart of FIG. 4 shows the range wherein the dielectric anisotropy, which is the value of the dielectric constant in the direction parallel to the longitudinal axis of the liquid crystal molecule, less the dielectric constant perpendicular to this axis, changes with the applied frequency. From this chart, it will be observed that the crossover frequency for the dual frequency material of FIG. 3B, would be about 1000 Hertz for the host liquid crystal used, and when the temperature is approximately 22 degrees C.

Figure 5:
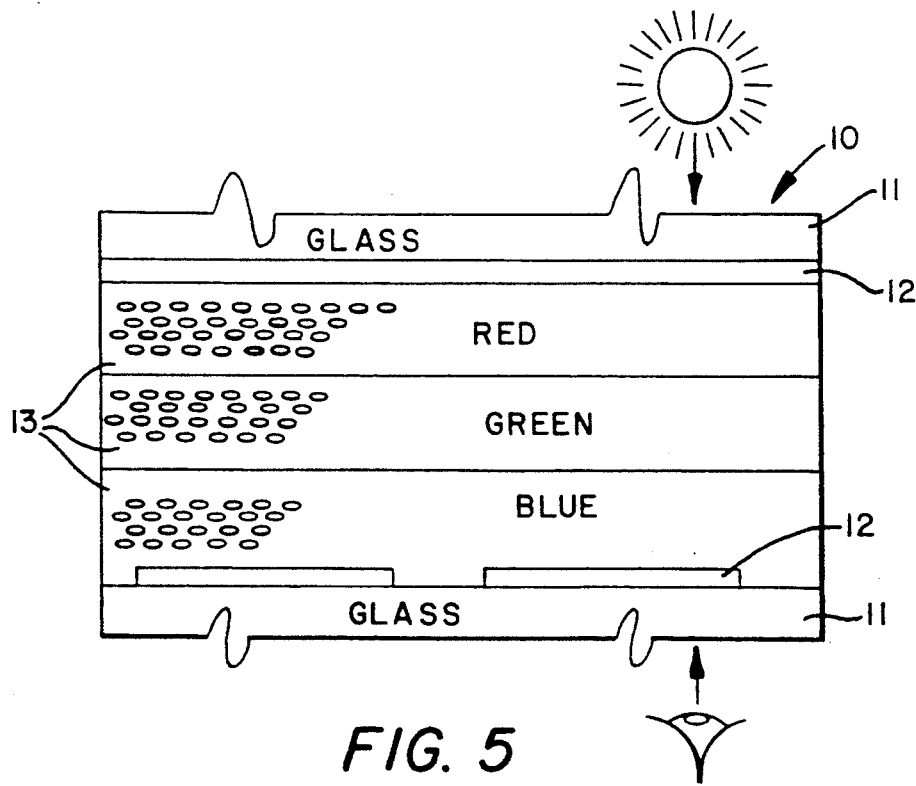
FIG. 5 is a representation of a cross section through a liquid crystal display device having segmentated layers separating groups of polymer dispersed liquid crystals (PDLC) according to their individual structures and the color of the dye contained within the droplet.

The device shown in FIG. 5, illustrates the employment of three layers within the liquid crystal display housing 10, wherein each layer contains droplets of the same structure, orientation and dye material. The outer layers of this device are relatively thick glass substrates, 11, which are approximately 43 mils thick, and to which layers are deposited on the inner sides, layers 12, which comprise the ITO (indium tin oxide) coatings that form the electrodes, which are separated by a distance of 30 micrometers, which is the space available for the plurality of droplets in the three separated layers 13 of FIG. 5, and for the entire single layer 13A of the space occupied by the droplets of FIG. 6.

The Table 1, shown below, lists the electrical parameters necessary to provide the colors red, green and blue respectively, in the droplets of FIG. 6. When a voltage of selected frequency and strength is applied to the device, the display shows colors blue, green, red, or colorless as shown in Table 1. The colors can be mixed by mixtures of momentarily applied voltages and frequencies. Different complementary colors may be obtained by changing the electrical parameters so rapidly that the human eye detects the complementary color rather than the two separate colors that are being combined. The following chart shows the results of selective electric parameters:

TABLE 1

| | | Full Color Function Grid | | |
|---|---|---|---|---|
| Applied Voltage V | Frequency f | Red High turn-on V Small $\Delta\epsilon < 0$ | Green Low Voltage $\Delta\epsilon > 0$ at low f $\Delta\epsilon < 0$ at high f | Blue Low turn-on V $\Delta\epsilon > 0$ |
| Zero | | Colorless | Colorless | Blue |
| Low Voltage | Low Values | Colorless | Colorless | Colorless |
| Low Voltage | High Values | Colorless | Green | Colorless |
| High Voltage | Low Values | Red | Colorless | Colorless |

All of the host liquid crystal materials used have a small delta "n" ($<0.07$), so that the average refractive index of the droplet is not significantly different for any direction of incident light. The droplets of the first set of FIG. 5 are dispersed in a thin polymer film (10 $\mu$m) to make a blue color filter where the refractive index of the polymer is selected to be about $(n_o+n_e)/2$; the film will possess almost no scattering in both the field "ON" and "OFF" states. The polymer film containing the second set of microdroplets is a green color filter only in the case where high frequency and low voltage is applied. The film with the third set of microdroplets is a red color filter when high voltage is applied because of the small delta-epsillon. These materials can be applied to a substrate in the methods shown in FIGS. 5 and 6.

Figure 6:
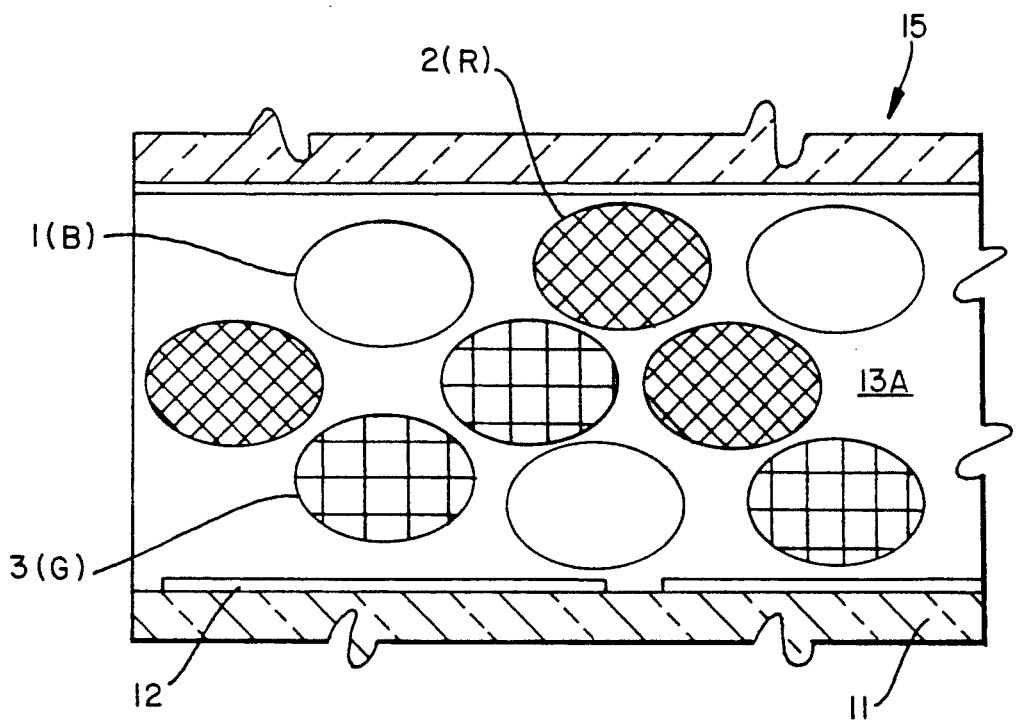
FIG. 6 is a display configuration with three kinds of droplets with different skins, liquid crystal structures and dyes, but being contained within a common polymer transparent medium.
Figure 6A:
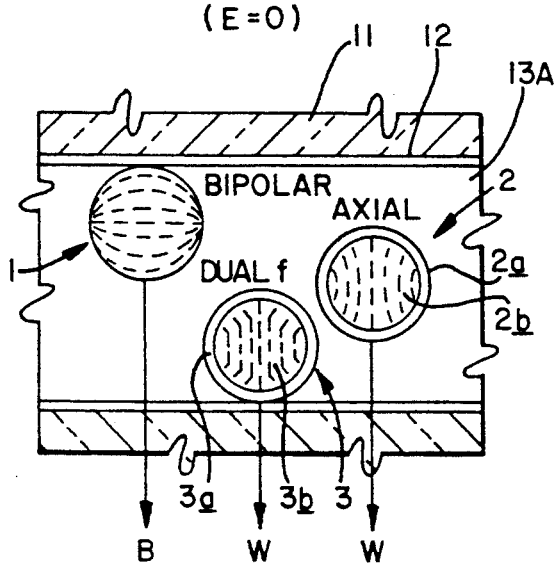
FIG. 6A is a display configuration showing the reaction of the three kinds of droplets in the presence of a zero voltage condition.
Figure 6B:
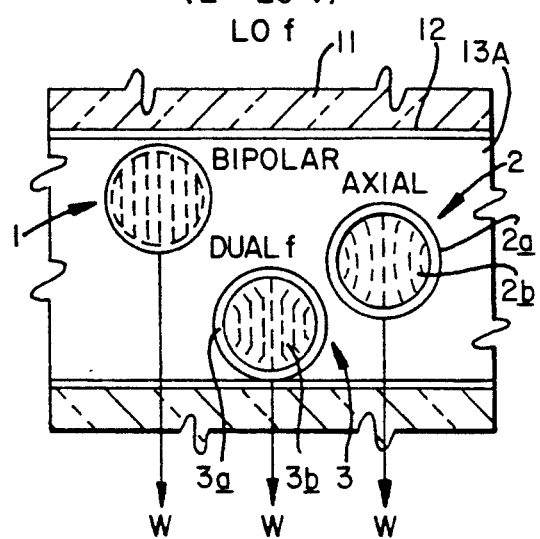
FIG. 6B is similar to FIG. 6A, but with low voltage and low frequency conditions.
Figure 6C:
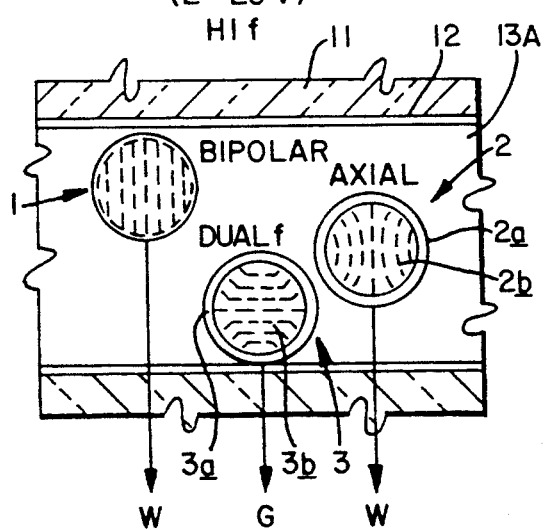
FIG. 6C is similar to FIG. 6A, but with low voltage and high frequency conditions.
Figure 6D:
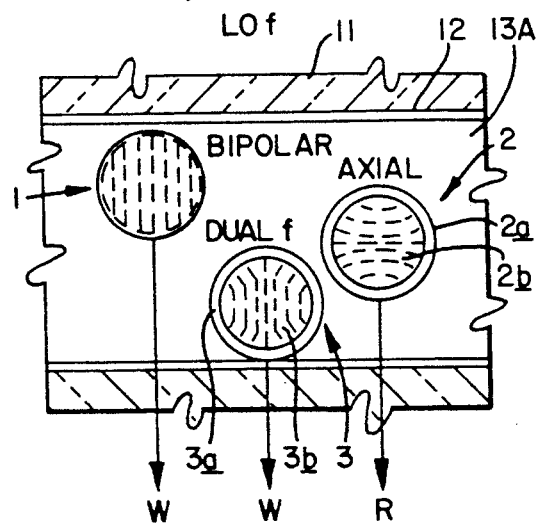
FIG. 6D is similar to FIG. 6A, but with high voltage and low frequency conditions.

FIGS. 6A through 6D of the drawing, depict a representation of the droplets of FIG. 6, when they are subjected to the various operational electrical parameters, namely changes in voltage and/or frequency. The bipolar structured LCD droplets contains a blue dye in its mixture, so in the absence of an electric field, it will display a blue color, whereas the axial structured droplet and the dual frequency axial droplet will remain colorless, as shown in FIG. 6A. Under conditions of low voltage and low frequency, all of the droplets will be colorless, as shown in FIG. 6B. In FIG. 6C, the droplets are subjected to a low voltage and high frequency field, and only the dual frequency droplet will display a color, i.e., green. The droplets of FIG. 6D are in the presence of a high voltage, low frequency field, and the only color displayed will be that of red from the axial droplets.

There are at least the following advantages flowing from the use of this full color PDLC device and method shown:

1. The color elements can be very small, such as a unit pixel, since the microdroplets are about 1 μm in diameter.

2. The film is solid and can be coated or painted on a large area, even one with a curved or flexible surface.

3. The color can be changed in the same location by changing the electric field parameters.

COMPENDIUM OF THE INVENTION

The use of polymer-dispersed liquid crystals (PDLC) for information display has attracted the interest of several researchers, because PDLC's do not require polarizers and displays can be simply fabricated on large flexible substrates. Dyes may be incorporated in the liquid crystal materials to add color and improve contrast. The display modes achieved so far, however, have been monochromic, allowing the display to switch only between a clear and colored state.

A new PDLC display mode with three different dyes dissolved in three different kinds of nematic microdroplets, each of which can be switched independently by changing the strength and frequency of applied electric field allows the achievement of a full color miniature liquid crystal display.

Two kinds of nematic droplet structures are used in this multi-colored PDLC display mode: the bipolar structure (FIGS. 1A/1B), and the axial structure (FIGS. 2A/2B).

For the bipolar structure, tangential alignment at the boundry is needed, while for axial structure, perpendicular alignment is required.

For the bipolar nematic droplet with positive dielectric anisotropy ($\Delta\epsilon > 0$), when an external electric field is applied, the director will align parallel to the direction of the external field, as shown in FIG. 1B; while the axial nematic droplet with a negative dielectric anisotropy ($\Delta\epsilon < 0$), under the applied electric field, the directors will align perpendicular to the external field as shown in FIG. 2B.

The axial structure is used by the newly developed "Reverse Mode Microdroplet Liquid Crystal Display" (Prior Art reference #6, and in U.S. Pat. No. 5,056,898 of the instant inventors.

For the miniature color display mode, a third kind of liquid crystal material is needed, one of dual-frequency property ($\Delta\epsilon > 0$ at low frequency, and $\Delta\epsilon < 0$ at high frequency), as illustrated in FIGS. 3A and 3B.

We add red dye to the axial nematic microdroplets with $\Delta\epsilon < 0$ to form "red cells"; blue dye to the bipolar nematic microdroplets with $\Delta\epsilon > 0$ to form "blue cells"; and green dye to the axial nematic microdroplets with the dual-frequency liquid crystal host to form "green cells". All three liquid crystal host materials should have small $\Delta n (<0.07)$, so that the average refraction index of the droplets will not be significantly different for the incident light from any direction. The refractive index of the polymer matrix that hosts the cells is selected to be comparable $(n_e + n_o)/2$, so that the scattering of the incident light is reduced to be insignificant and the film appears to allow almost no scattering in either the field "ON" or the field "OFF" state.

A polymer film with only the green cells can be used as a green color filter, switching on with a high frequency voltage. When the high frequency drives $\Delta\epsilon$ negative, the electric field will align the direction of the field. All the light, except the green, entering the film will be absorbed by the dye.

Similarly a film with the red cells will be a red filter under high voltage, if we choose a liquid crystal host with small $\Delta\epsilon$; and a film with blue cells acts as a blue filter, under a lower voltage than the one used for the red filter, with suitable choice for its $\Delta\epsilon > 0$.

A three color display film is formed by stacking the three films of color filters together and sandwiching them between a pair of glass substrates with ITO patterns, as shown in FIG. 5. Another way of making the display film is to have the three kinds of cells uniformly dispersed in a polymer film, as shown in FIG. 6. The switching property of the display film is not significantly different in either method.

Table 1 lists the four states of display mode, their switching V-f range, color of the transmitted light and director structure for each kind of the colored cell. This is only one of the possible arrangements; there are many other combinations which may be selected.

From Table 1, we see that this new PDLC film gives four states: red, green, blue and white (colorless). By mixing the four states temporarily, we obtain any color. To do so, we need to be able to switch among these states fast enough so that our eyes will see only a color which is a mixture of three primary colors. The proportion of each "primary color" is proportional to the time that each color is allowed to stay at its "ON" state.

With the refractive index of the polymer matching $n_e$ and $n_o$ of the liquid crystal droplet, also with small $\Delta\epsilon$ ($<0.07$), all of the states of the display, no matter whether color-on or color-off, will be transparent. This property makes the display useful in applications such as TV projectors. When the refractive indices are mismatched, the color-on states will become opaque, with the colors as listed in Table 1, while the colorless state can still be made transparent, if we choose $n_o = n_p$, where $n_p$ is the refractive index of the polymer. A film made this way can also be used for making display devices. If we use the film reflectively, we can switch it among a black background (transparent state), and three colored, but opaque states, by applying suitable voltage with suitable strength and frequency. For all three kinds of color cells, the ideal situation is to have directors and dye molecules uniformly aligned along the Z-axis in the color-off states, and perpendicular to the Z-axis in the color-on states. The real configuration of directors however, is determined by field, boundry alignment and size and shape of the droplets. The field and size effect has been studied by Zumer and Doane (Prior Art reference No. 7). The shape effect is of particular importance in the reverse mode display (U.S. Pat. No. 5,056,898).

To make a display film with a large viewing angle, it is very important to make sure that for each cell in its colorless state, the directors be aligned parallel to the Z-axis as much as possible; in a word, to be more "axial-like". From the information shown in Table 1, we see that for a blue cell, its colorless state can be helped by applying higher voltage or choosing higher value for $\Delta\epsilon$, the same is true for a green cell under low frequency voltage. But for a green cell under zero voltage and for a red cell, their colorless states cannot be helped by an applied field. The only way to acheive better alignment is to choose liquid crystal material with higher value of electric constant, and make the cells flatter, or to decrease the size and/or the anchoring energy at the boundary.

The full color PDLC display method reported here is the first V-f switchable, miniature (in this specification, "miniature" means miniature thickness only) display, and has the following features:

1. The color element, like a unit pixel, can be made very small, since the microdroplets are only about 1 μm in diameter, compared to 100 μm of the lateral dimension for the other methods of LCD's.
2. The V-f switching mode makes color selection as well as gray scale control possible at the same time.

The devices and methods shown herein may be accomplished in many ways, within the scope of the appended claims:

What is claimed is:

1. A method of activating a particular color in a liquid crystal display device comprising a plurality of polymer dispersed liquid crystal droplets each containing a dye material of red, green, or blue color and comprising the steps of:
   a. applying an electrical field of zero voltage to activate the droplets containing the blue dye to produce a blue color display,
   b. applying an electrical field of low voltage or high frequency to activate the droplets containing the green dye, and
   c. applying an electrical field of the high voltage or low frequency to activate the droplets containing the red dye.

2. A mixture of droplets for use in a full color LCD device comprising:
   a. a group of said droplets enclosing molecules of a liquid crystal material having a homeogeneous orientation,
   b. a second group of droplets enclosing molecules of a liquid crystal material having a homeotropic orientation,
   c. a third group of droplets enclosing molecules of a liquid crystal material having a homeotropic orientation, and
   d. a different color dye material in each of said groups.

3. A full color electrically controlled liquid crystal display device, utilizing a single set of control electrode, comprising:
   a. three groups of pluralities of microdroplets, each droplet comprising a liquid crystal material, and a primary color dye material,
   b. droplets in each distinct group comprising a different liquid crystal material and a different dye material from corresponding materials in the other two groups in the same liquid crystal display device,
   c. droplets in one group comprising molecules that in a field-on state, align in the direction of the applied electric field, said one group being identified as a bipolar liquid crystal structure,
   d. droplets in a second group comprising molecules that do not align in the direction of an applied electric field, but align perpendicular to said applied electric field, said second group material being identified as an axial structure,
   e. droplets in the third group comprising molecules that align in the direction of a low frequency, high voltage electric field, but do not align in the direction of a high frequency electric field, said third group liquid crystal material being identified as a dual frequency axial structure, and
   f. means for applying a predetermined voltage and frequency combination for a predetermined time period in order to provide any mixture of colors in a full color spectrum.

4. A full color electrically controlled liquid crystal display device as in claim 3, utilizing a single set of control electrodes, comprising:
   a. at least three groups of pluralities of microdroplets, each droplet comprising a liquid crystal material and a primary color dye material,
   b. droplets in each distinct group comprising a different liquid crystal material and a different dye material from corresponding dye materials in the other groups in the same liquid crystal display device,
   c. droplets in one group comprising molecules having a homeogeneous orientation that align in the direction of an applied electric field, and wherein said one group has a dielectric anisotropy greater than zero,
   d. droplets in a second group containing molecules having a homeotropic orientation that align perpendicular to the direction of an applied electric field, and wherein said second group has a dielectric anisotropy less than zero,
   e. droplets in the third group comprising molecules having a homeotropic orientation that align in the direction of an applied low frequency, high voltage electric field, but align perpendicular to the direction of a high frequency electric field, said third group liquid crystal material having a dielectric anisotropy greater than zero in the presence of a low frequency, high voltage electric field, and having a dielectric anisotropy less than zero in the presence of a high frequency, low voltage electric field, and
   f. means for applying a predetermined voltage and frequency combination for a predetermined time period in order to provide any color or any mixture of any colors in a full color spectrum.

* * * * *